(12) United States Patent
Keck et al.

(10) Patent No.: US 7,753,646 B1
(45) Date of Patent: Jul. 13, 2010

(54) SYSTEMS AND METHODS FOR COOLING BEARINGS

(75) Inventors: James A. Keck, Round Rock, TX (US); Donald M. Hudson, Austin, TX (US); Paul C. Peterson, Austin, TX (US)

(73) Assignee: Active Power, Inc., Austin, TX (US)

( * ) Notice: Subject to any disclaimer, the term of this patent is extended or adjusted under 35 U.S.C. 154(b) by 437 days.

(21) Appl. No.: 11/498,271

(22) Filed: Aug. 1, 2006

(51) Int. Cl.
*F04D 29/08* (2006.01)
(52) U.S. Cl. .................................. 415/112; 415/229
(58) Field of Classification Search ............... 415/111, 415/112, 116, 117, 229; 384/317, 320, 321, 384/476, 900
See application file for complete search history.

(56) References Cited

U.S. PATENT DOCUMENTS

| | | | | |
|---|---|---|---|---|
| 2,886,285 A | * | 5/1959 | Buck | ............................ 384/100 |
| 3,003,395 A | * | 10/1961 | Buck | ............................ 359/200 |
| 4,156,342 A | * | 5/1979 | Korta et al. | ................. 60/39.08 |
| 4,465,427 A | * | 8/1984 | Libertini et al. | ................. 415/1 |
| 5,743,717 A | * | 4/1998 | Schmidt | ...................... 417/109 |
| 2005/0008269 A1 | * | 1/2005 | Akutsu et al. | .................. 384/12 |

* cited by examiner

*Primary Examiner*—Edward Look
*Assistant Examiner*—Ryan H Ellis
(74) *Attorney, Agent, or Firm*—Hulsey, P.C.

(57) ABSTRACT

Systems and methods are provided for cooling bearings or other objects. Such cooling may be accomplished by expanding a compressed gas in a cooling channel surrounding a bearing and allowing the expanded air to come into direct contact with the bearing. Expanding a compressed gas in local proximity of the bearing takes advantage of the Joule-Thompson expansion of gas, resulting in a substantial drop in gas temperature, thereby maximizing the cooling potential of the gas being directly applied to the bearing. Cooling bearings in this manner extends their operational life and enables them to operate at the desired speeds. A housing may be provided for receiving a compressed gas, expanding the compressed gas to a predetermined pressure, enabling the expanded gas to directly contact the bearing, and exhausting the expanded gas.

8 Claims, 15 Drawing Sheets

SYSTEMS AND METHODS FOR COOLING BEARINGS

BACKGROUND OF THE INVENTION

This invention relates to systems and methods for removing heat from a system, and in particular, removing heat from bearings or other objects.

Bearings, bushings, and other points of support are used for many different applications requiring support for a rotating body. An example of one such application is an electrical machine such as a generator and/or motor. The rotor of such machines are typically mounted between two bearings, which bear the load of the rotor. During operation of the electric machine, heat may be generated by the stator core, stator windings, bearings, rotor, rotor windings and other sources. Heat may be detrimental to machine performance and operational life. For example, excess heat can decrease the flux capacity of permanent magnets in the machine and damage machine components such as bearings and windings (e.g., stator and rotor windings). In additional respect to bearings, lubricants contained therein may be subject to degradation, burning, or other detrimental effects which may reduce the performance or operational life of the bearing, or destroy it altogether.

Conventional methods for cooling electric machines include auxiliary cooling fans, circulating water systems, and/or circulating oil systems. Other systems may use compressors to route high velocity air as may be needed to achieve desired cooling. Though such cooling systems are able to cool electric machines and components thereof (e.g., bearings), they require substantial maintenance, a supply of power to operate, and can be costly. Moreover, such cooling systems may be limited in their capacity to remove heat from the machine and thus may be unable to maintain an appropriate operating temperature, especially in high speed applications.

One such example of a high speed application in which bearings or other points of support may be used include turbine-generators. A turbine-generator is an electrical machine (e.g., a generator) integrated with a turbine. The turbine may be directly coupled to the rotor shaft of the electrical machine and cause the rotor to rotate when driven by a working fluid (e.g., gas). The rotor shaft may be supported by two or more bearings, such as Model Number SER-201, 13 mm bore by NHBB Corporation of Peterborough, N.H. When grease lubrication is used, this bearing can produce approximately 600 Watts of heat when operating at 70,000 rpm.

Turbine-generators are highly customizable, and may be used in various applications or systems such as, for example, thermal and compressed air storage (TACAS) or compressed air storage (CAS) energy systems. In some TACAS and CAS systems, a micro-turbine-generator, such as a micro-turbine system available from Capstone Turbine Corporation of Chatsworth, Calif. may be used to generate power for a load. A micro-turbine operating in a TACAS or CAS system may operate at high shaft speeds, which is necessary for generating a requisite quantity of power in as small a package as possible, and therefore may require cooling to remove heat from the bearings and other parts of the turbine-generator during operation.

Turbine-generators and other devices requiring bearings may use many different types of bearings, depending on factors such as size, speed, loading requirements, and other suitable factors. Different types of bearings provide different advantages but may have various drawbacks. For example, grease lubricated anti-friction type bearings are highly economical and handle high rotational speeds. This type of bearing may be suitable for use in high-speed turbine-generator applications. However, lubricants contained in anti-friction bearing types may heat up at high speeds and erode, thereby reducing the performance of the bearings. Sleeve type bearings can be economical but may not operate at high speeds. Alternatively, gas lubricated sleeve type bearings are capable of operating at high speeds but are generally not economical.

Accordingly, it would be desirable to provide systems and methods to improve cooling of bearings or other objects.

SUMMARY OF THE INVENTION

In accordance with the principles of the present invention, systems and methods are provided for cooling bearings or other objects. Such cooling may be accomplished by expanding a compressed gas in a cooling channel surrounding a bearing and allowing the expanded air to come into direct contact with the bearing, or more particularly, the outer race of the bearing. Expanding a compressed gas in local proximity of the bearing takes advantage of the Joule-Thompson expansion of gas, resulting in a substantial drop in gas temperature. The higher temperature differential between the bearing and cooling medium, combined with direct contact with the bearing outer race helps to maximize the convective heat transfer. Cooling the bearings, and consequently, the lubrication, in this manner may extend their operational lives and enables them to operate at the desired speeds. In addition, such cooling enables use of bearings in applications not previously economically or practically possible. For example, bearing cooling according to this invention permits use of grease lubricated anti-friction bearings in high speed applications that previously resulted in severely diminished bearing performance and life.

A housing may be provided for receiving a compressed gas, expanding the compressed gas to a predetermined pressure, enabling the expanded gas to directly contact the bearing, and exhausting the expanded gas. If desired, the exhausted air may be routed to or across components of a system. In one embodiment, the housing may be used to house bearings in a turbine-generator. When the turbine-generator is operating, compressed air may be provided to the housing, expanded, and used to provide localized cooling of the bearings housed therein. If desired, the exhausted gas may be routed across various components (e.g., rotor, stator windings, etc.) of the turbine-generator to promote further cooling of the turbine-generator.

The housing and techniques for cooling bearings may be used in electrical generation systems such as backup and continuously operating TACAS and CAS energy generation systems. Such systems may generate power from a source of compressed gas such as a pressure tank. When power is needed, compressed gas may be released from the gas source, expanded to a predetermined pressure (which results in a Joule-Thompson cooling of the compressed gas), optionally heated, and used to drive a turbine, which in turn drives a generator to produce power. A portion of the cool compressed gas may be routed to at least one housing in the generator and/or turbine to provide localized cooling. Thus, although the compressed gas is already cool due to expansion of the compressed gas supplied by the gas source, the housing permits further expansion of the cool compressed gas, resulting in a further reduction in temperature when being applied to the bearing. Such cooling provides significant cost savings by allowing grease lubricated anti-friction bearings to be used in the generator and/or turbine for at least the expected operational life of the CAS or TACAS system.

BRIEF DESCRIPTION OF THE DRAWINGS

The above and other features of the present invention, its nature and various advantages will become more apparent upon consideration of the following detailed description, taken in conjunction with the accompanying drawings, in which like reference characters refer to like parts throughout, and in which.

DETAILED DESCRIPTION OF THE INVENTION

Figure 1:
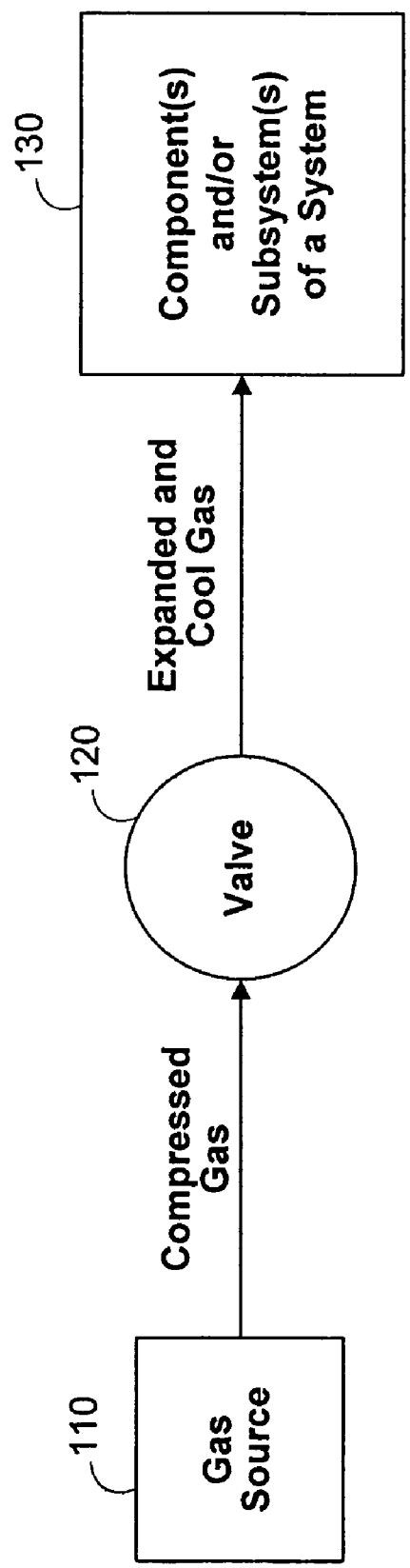
FIGS. 1 and 2 are block diagrams that generally illustrate how a cooling fluid is derived in accordance with the principles of the present invention.

FIG. 1 is a block diagram illustrating how cool gas can be derived and used to cool bearings and/or other components of a system in accordance with the principles of the present invention. Cool gas is obtained by expanding gas from a high to low pressure. This high-to-low pressure drop results in a Joule-Thompson expansion of gas that results in a substantial drop in gas temperature. For example, expansion of gas from a relatively high pressure (e.g., 4500 PSIA) to a lower pressure (e.g., 400 PSIA) can result in gas temperatures of thirty degrees centigrade or lower. Such cool gas temperatures are much lower than temperatures achieved using conventional fans and water or oil cooling systems. As shown in FIG. 1, cool gas may be derived by expanding compressed gas provided by gas source 110 across valve 120 to a lower pressure than that of the compressed gas upstream of valve 120.

Gas source 110 may represent a point in a gas flow path having gas at a higher pressure than another point in the gas flow path. In some embodiments, gas source 110 may be a pressure tank, a cavern, a salt dome, a conduit such as a pipe, or other device capable of containing a pressurized gas. In other embodiments, gas source may be a compressor. Valve 120 is representative of a device that permits gas to expand, and in some embodiments, a device that expands gas to a predetermined pressure. For example, valve 120 may be a pressure regulator or a flow control valve.

When the cool gas is derived, it may be routed as desired to various components and/or subsystems, including bearings, of a system. For example, the cool gas may be routed to components and/or subsystems independently of each other. That is, a separate path may route cool gas to each component and/or subsystem. As another example, the cool gas may be routed to components and/or subsystems in combination with each other. That is, a single series path or multiple parallel paths may be used to route cool gas to two or more components and/or subsystems. Several examples of ways to route gas to components of system are described in U.S. patent application publication Nos. 2006/0059936 and 2006/0059937, which are incorporated by reference herein their entireties.

Figure 2:
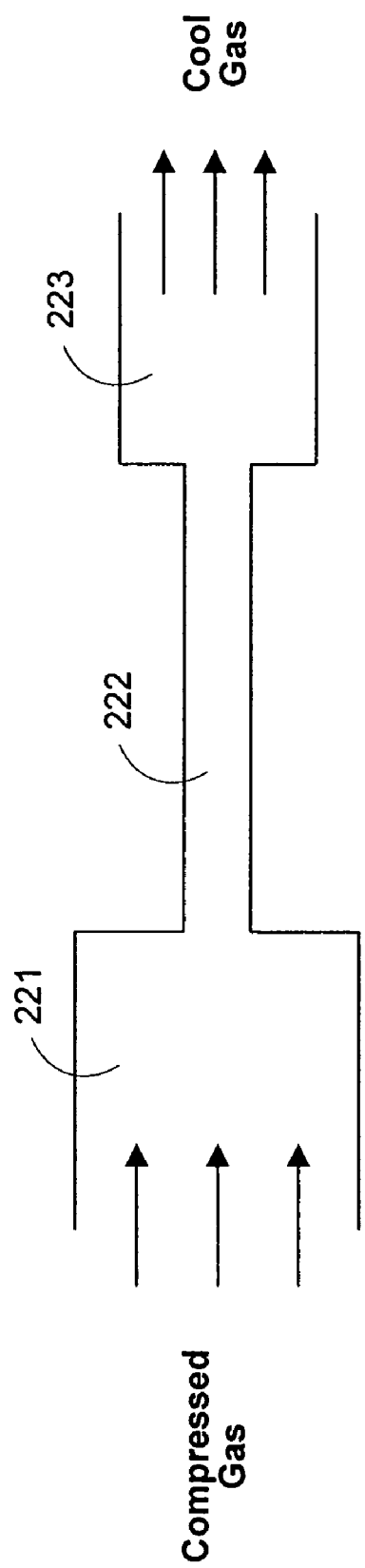

FIG. 2 is a block diagram illustrating an alternative way in which cool gas can be derived and used to cool bearings and/or other components of a system in accordance with the principles of the present invention. FIG. 2 shows a high pressure region 221, a restriction region 222, and a low pressure region 223. High pressure region 221 represents a section in a gas flow path having compressed gas at a higher pressure than a point downstream in the gas flow path (e.g., sections 222 and 223). Restriction region 222 fluidicly couples high pressure region 221 to low pressure region 223 and permits gas to flow from high to low pressure. The size or cross-sectional area of restriction region 222 may determine the flow of gas from high pressure region 221 to low pressure region 223. Low pressure region 223 represents a section in the gas flow path that permits the compressed gas provided by high pressure region 221 to expand or decompress. Low pressure region 223 may be connected to a region (not shown) which permits the gas in low pressure region 223 to further decompress, for example, to an ambient pressure. Thus, the temperature of the gas in low pressure region 223 may be lower than the temperature of the gas in high pressure region 221.

The principles discussed above for deriving a cool gas may be employed by a housing according to the invention to cool bearings or other point objects. Reference to the object being cooled will be referred to herein as a bearing, though it is understood that the object is not limited to bearings. Such cooling may be accomplished by expanding a compressed gas in a cooling channel (e.g., a low pressure region) surrounding a bearing and allowing the expanded air to come into direct contact with the bearing. An advantage of this invention is that the compressed gas is expanded in local proximity of and applied directly to the bearing, thereby maximizing the cooling effect of the gas being routed to the bearing. In addition, the degree to which the gas is expanded or decompressed can be controlled. For example, the housing may permit the gas to expand to near ambient pressure to maximize the Joule-Thompson cooling.

A housing may be constructed to include an inlet port, a restriction region, a cooling channel, and at least one exhaust port. The inlet port may be analogous to high pressure region 221 (of FIG. 2); the restriction region may be analogous to restriction region 222 (of FIG. 2); and the cooling channel may be analogous to low pressure region 223 (of FIG. 2). When the housing is mounted to a bearing or other device, an air tight seal is formed between the bearing and the housing. This air tight seal forces the expanded gas to flow around the bearing in the cooling channel to one or more exhaust ports. The seal prevents gas from escaping the cooling channel by way of any passageway that may exist between the housing and the bearing.

The sizing of the restriction region, the cooling channel, and the one or more exhaust ports may be designed to obtain desired gas properties. For example, it may be desirable to obtain maximum expansion of the gas within the cooling channel, while ensuring the pressure of the gas in the cooling channel is maintained at a higher pressure than the pressure of the region where the gas is exhausted. In other words, the gas may not be permitted to fully expand to an atmospheric pressure within the cooling channel. This may be achieved by sizing the exhaust ports such that the ratio of the total cross-sectional area of the exhaust ports to the cross-sectional area of the restriction region is a predetermined percentage (e.g., 70-80%) of the ratio of the density change from the supply conditions to atmospheric conditions. For example, the exhaust ports may be sized such that the ratio of the total cross-sectional area of the exhaust ports to the cross-sectional area of the restriction region is a predetermined value (e.g., about 18).

By allowing the gas to expand close, but not all the way, to atmospheric pressure several advantageous benefits are realized. For example, uniform cooling of the bearing may be achieved because the expanding gas may be distributed evenly throughout the cooling channel. This is a particular advantage over forced convection systems which may be subject to localized hot spots or uneven cooling due to uneven flow conditions. Another advantage that may be realized is improved heat transfer. Improved heat transfer may be achieved because localized expansion of gas further cools the gas, as compared to merely forcing gas through a cooling path. Improved heat transfer may also be achieved by providing sufficient exhaust gas velocity, which improves the rate at which heat is removed from the housing. A desired exhaust gas velocity may be obtained by allowing the gas to expand as it exhausts out of the exhaust ports.

Figure 3:
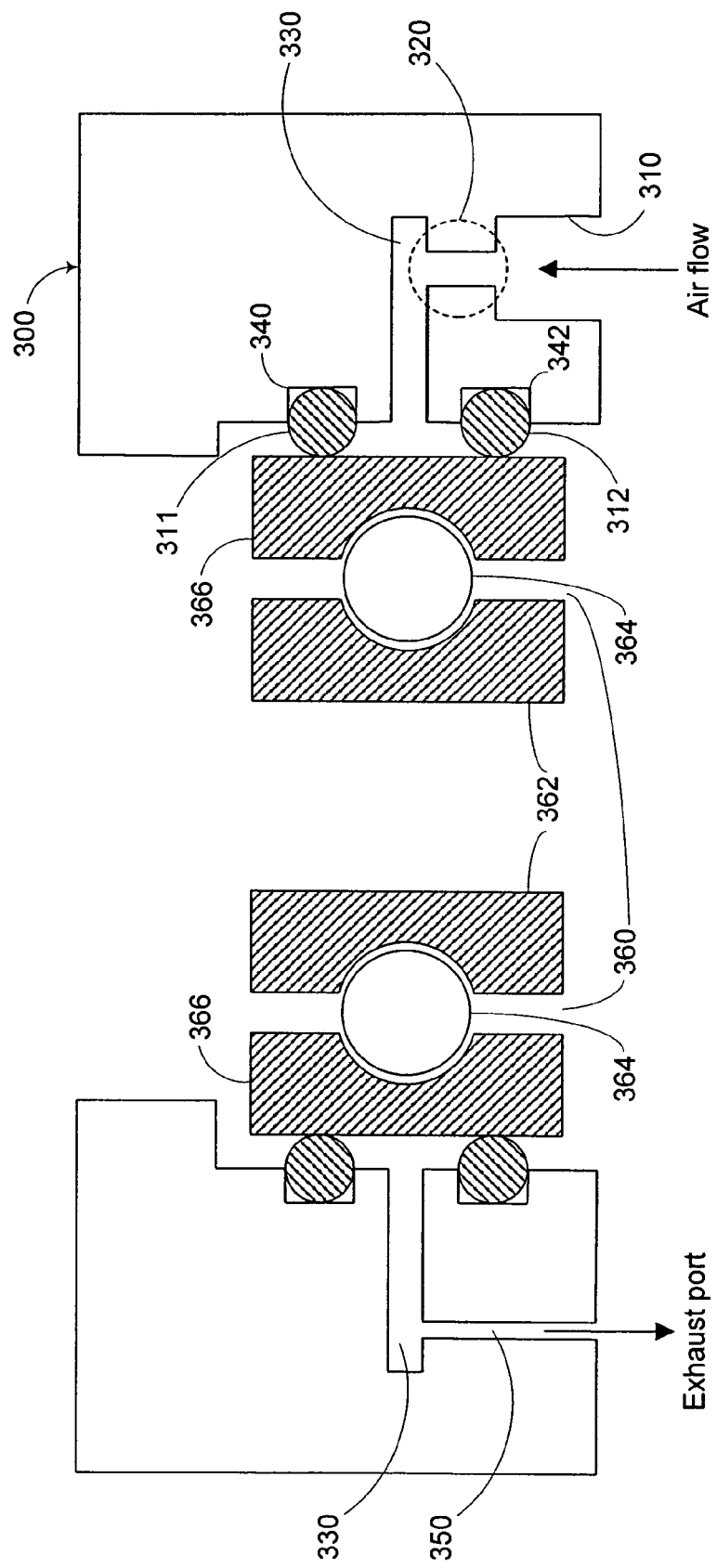
FIG. 3 shows a cross-sectional view of a housing in accordance with the principles of the present invention.

FIG. 3 shows a cross-sectional view of a housing 300 in accordance with the principles of the present invention. As shown, housing 300 includes an inlet port 310, a restriction region 320, a cooling channel 330, membrane channels 340 and 342, and at least one exhaust port 350. FIG. 3 further shows a bearing 360 mounted to housing 300 via membranes 311 and 312. Bearing 360 may include inner race 362, ball bearings 364, and outer race 366. Inner race 362 is the part of bearing 360 that directly contacts a rotating body (e.g., a rotor) (not shown). Thus, inner race 362 spins when the rotating body spins, while outer race 366 may remain stationary.

As shown in FIG. 3, housing 300 may receive gas through inlet port 310. Inlet port 310 may be oriented in any suitable position within housing 300. In FIG. 3, inlet port 310 is positioned axial with respect to bearing 360. Other orientations such as radial and oblique directions (e.g., a direction between radial and axial directions) may be practiced.

Housing 300 may secure bearing 360 in place via membranes 311 and 312, which may be contained in membrane channels 340 and 342, respectively. Membranes 311 and 312 may provide a resilience mounting for bearing 360. In addition, membranes 311 and 312 (e.g., o-rings) may provide an air tight seal between housing 300 and bearing 360 that forces gas to flow through cooling channel 330 and exit out of one or more exhaust ports 350.

As shown in FIG. 3, membrane channel 340 is aligned with a top portion of bearing 360 and membrane channel 342 is aligned with a bottom portion of bearing 360, with at least a portion of cooling channel 330 existing between both membrane channels 340 and 342. When membranes 311 and 312 are placed in channels 340 and 342, respectively, a seal is formed. This seal may serve to contain gas in cooling channel 330 and enables the gas to flow through cooling channel 330 in direct contact with bearing 360. More particularly, the gas may directly contact the portion of outer race 366 between membranes 311 and 312.

Figure 4A:
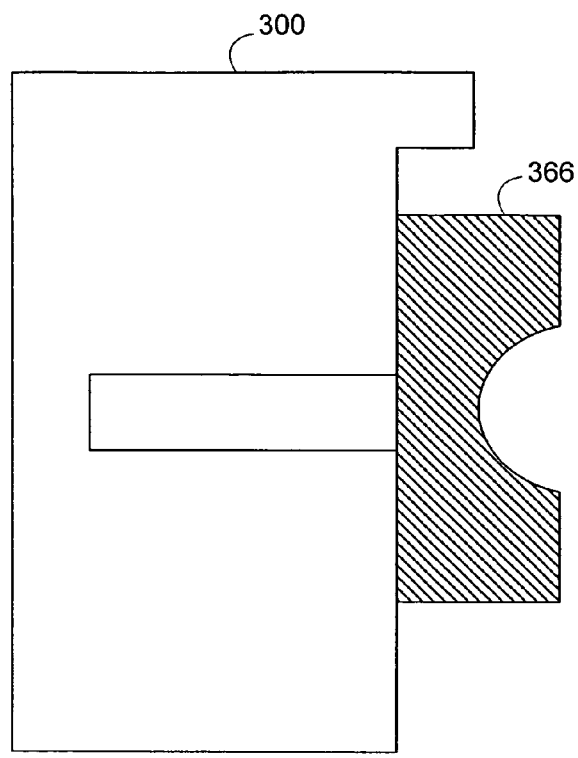
FIGS. 4A, 4B and 4C show partial cross-sectional views of alternative housings in accordance with the principles of the present invention.
Figure 4B:
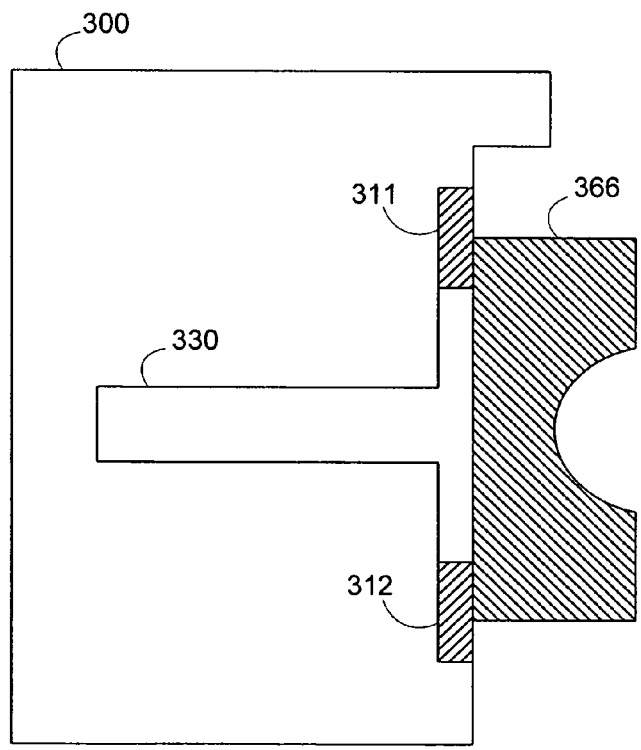

Persons skilled in the art will appreciate that many different approaches may be practiced to provide an air tight seal between housing 300 and bearing 360, and that the present invention need not be limited to the embodiments specifically described herein. For example, as shown in FIG. 4A, outer race 366 may fit flush against housing 300 to provide an air tight seal. FIG. 4B shows a housing 300 having a T-shaped cooling channel 330. Membranes 311 and 312 are placed at opposite ends of the T to act as endcaps (e.g., seals) of channel 330 when outer race 366 is mounted to housing 300. Note this approach increases the surface area exposure of the outer race versus the flush mounted housing illustrated in FIG. 4A.

Figure 4C:
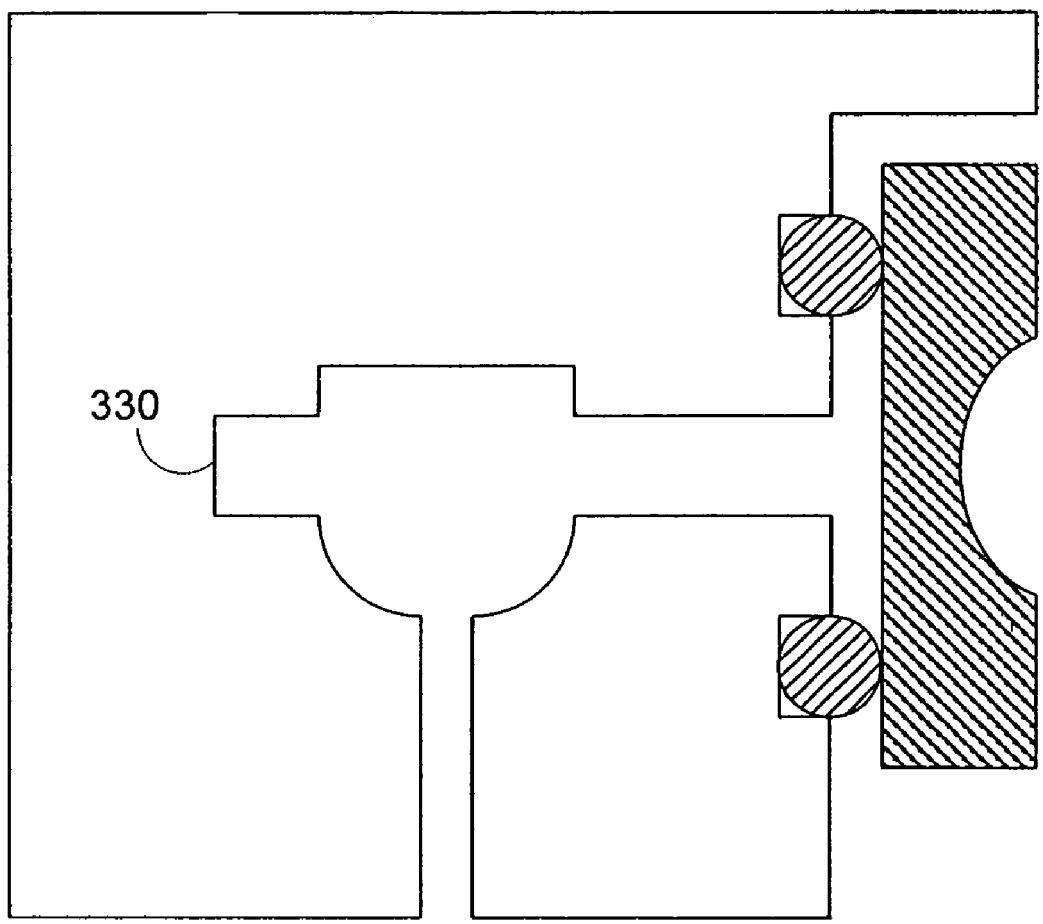

Referring back to FIG. 3, cooling channel 330 may be a groove of predetermined dimensions existing within housing 310 that is constructed to allow gas to expand and directly contact bearing 360. For example, channel 330 may be constructed to form a channel that encircles bearing 360. See, for example, FIG. 5 for an alternative view showing a cooling channel 510 which encircles a bearing 560. It may be desirable to maximize the volume of cooling channel 330. Therefore various alternative channel designs may be used to achieve a desired volume. In addition, alternative channel designs may be used to achieve desired flow characteristics (e.g., a design that promotes channeling of gas to exhaust ports). FIG. 4C shows a partial cross-sectional view of a housing having an alternative cooling channel 330 that is in accordance with the principles of the present invention.

Figure 6:
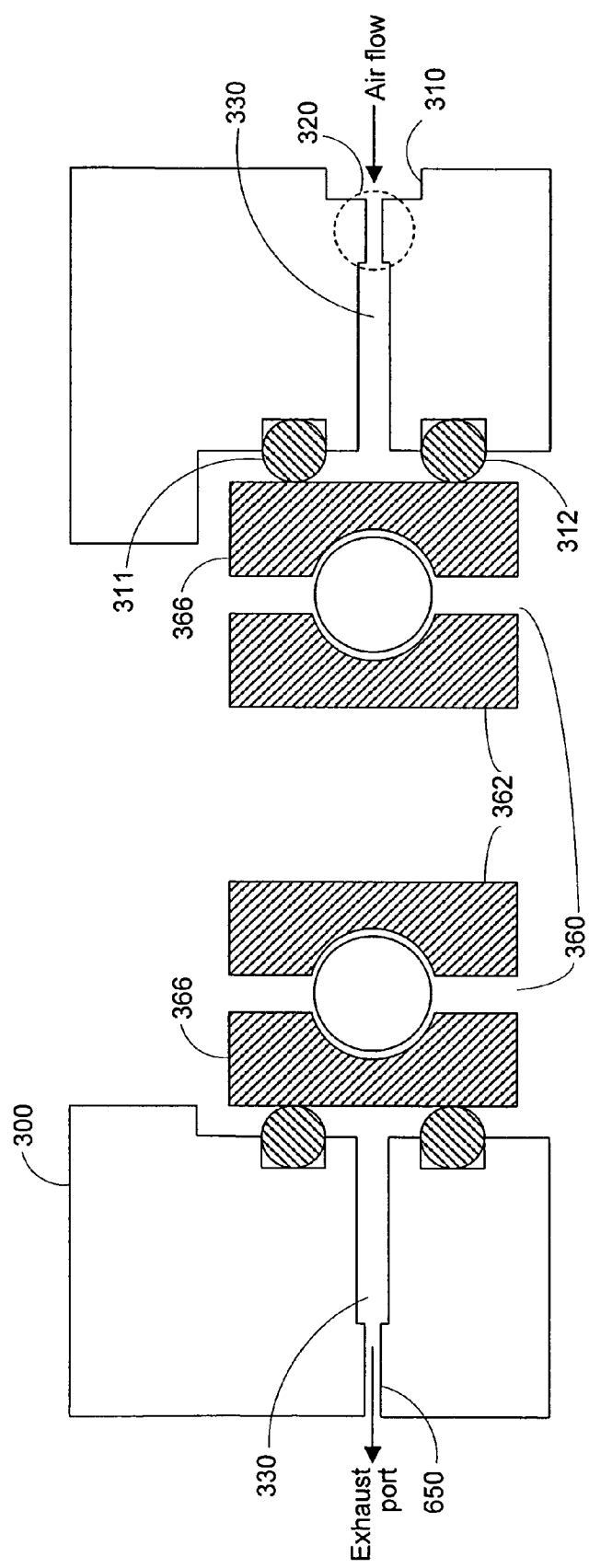
FIG. 6 shows a partial cross-sectional view of another alternative housing in accordance with the principles of the present invention.

Referring back to FIG. 3, housing 300 may include one or more exhaust ports 350 for permitting gas to exit cooling channel 330. Exhaust ports 350 may be constructed to release gas in one or more predetermined directions. For example, FIG. 3 shows that gas is exhausted in an axial direction with respect to a center axis of bearing 360. In another example, gas may be exhausted in a radial direction relative to a center axis of bearing 360, as shown in FIG. 6. FIG. 6 shows a cross-sectional view of a housing in accordance with the principles of the present invention having exhaust ports 650 operative to release gas in a radial direction with respect to a center axis of bearing 360. In yet another example, exhaust ports may release gas in an oblique direction (e.g., a predetermined direction between the axial and radial directions) with respect to a center axis of bearing 360. In a further example, a housing may be constructed to have exhaust ports releasing gas in two or more directions (e.g., ports exhausting in both radial and axial directions).

Several exhaust ports 350 may be positioned at predetermined locations in housing 310. For example, housing 310 may include a predetermined number (e.g., ten) exhaust ports equally spaced apart. See, for example, FIG. 5 which shows several axial exhausting exhaust ports 550.

Exhaust ports 350 may be sized to achieve desired performance properties of housing 300. For example, the sum total cross-sectional area of all exhaust ports 350 relative to the cross-sectional area of restriction region 320 may determine the extent to which gas expands in cooling channel 330. Note that the extent to which the gas expands affects the change in temperature of the gas in cooling channel 330. Thus, larger pressure drops result in cooler temperatures than smaller pressure drops.

In one embodiment, the sum total of the cross-sectional area of all exhaust ports 350 may be smaller than cross-sectional area of the restriction region 320. In another embodiment, the sum total of the cross-sectional area of all exhaust ports 350 may be substantially equal to the cross-sectional area of restriction region 320.

Restriction region 320 limits the flow of gas from the inlet port 310 to expansion channel 330. Restriction region 320 may also be referred to as an orifice. In addition, a sizing relationship between restriction region 320 and exhaust ports 350 may determine the extent to which gas expands in cooling channel 330. Restriction region 320 may be constructed using any suitable approach for restricting the flow of gas. In one approach, restriction region 320 may be a device having a fixed cross-sectional area. For example, the device may be a solid object having a through hole of a predetermined size.

In another approach, restriction region 320 may have a variable cross-sectional area. For example, restriction device may include a valve or chamber that can be controlled manually or electronically to provide variable cross-sectional areas. For example, if a system is operating at a relatively slow speed, then the amount of cooling needed by the bearings may be low. In such a situation, restriction region 320 may be variably controlled to increase its cross-sectional area to generate a smaller pressure drop in cooling channel 330 and thereby provide less cooling to the bearings. If the system is operating at a relatively high speed, then the bearings may require substantial cooling to avoid failure or malfunction. In such a situation, restriction region 320 may be variably controlled to decrease its cross-sectional area to generate a larger pressure drop in the cooling channel and thereby provide greater cooling to the bearings. Separate control mechanisms and sensors may be provided to detect the temperature of the bearings and dynamically alter the cross-sectional area of restriction region 320. Persons skilled in the art will appreciate that there may be times when the bearings require no cooling, and at those times restriction region 320 may be CLOSED to prevent entry of gas into cooling channel 330.

Cooling according to the principles of the present invention can be implemented in many different types of systems and applications requiring cooling of bearings or other objects. An example of one such application is an electrical machine such as a generator and/or motor. Another example is a turbine-generator. A turbine-generator is an electrical machine (e.g., a generator) integrated with a turbine. The turbine may be directly coupled to the rotor shaft of the electrical machine and cause the rotor to rotate when driven by a working fluid (e.g., gas). The rotor shaft may be supported by two or more bearings. Thus, a housing according to the invention may provide localized cooling to bearings in electrical machines and turbine-generators.

In addition, the housing and techniques for cooling bearings may be used in electrical generation systems such as backup and continuously operating TACAS and CAS energy generation systems. Such systems may generate power from a source of compressed gas such as a pressure tank. When power is needed, compressed gas may be released from the gas source, expanded to a predetermined pressure (which cools the compressed gas), optionally heated, and used to drive a turbine, which in turn drives a generator to produce power. A portion of the cool compressed air may be routed to at least one housing in the generator and/or turbine to provide localized cooling in accordance with the principles of the present invention. Thus, although the compressed gas is already cool due to expansion of the compressed gas supplied by the gas source, the housing permits further expansion of the cool compressed gas, resulting in a gas having a further decreased gas temperature that is directly applied to the bearing. Such cooling provides significant cost savings by allowing grease lubricated anti-friction bearings to be used in the generator and/or turbine for at least the expected operational life of the CAS or TACAS system.

Figure 7:
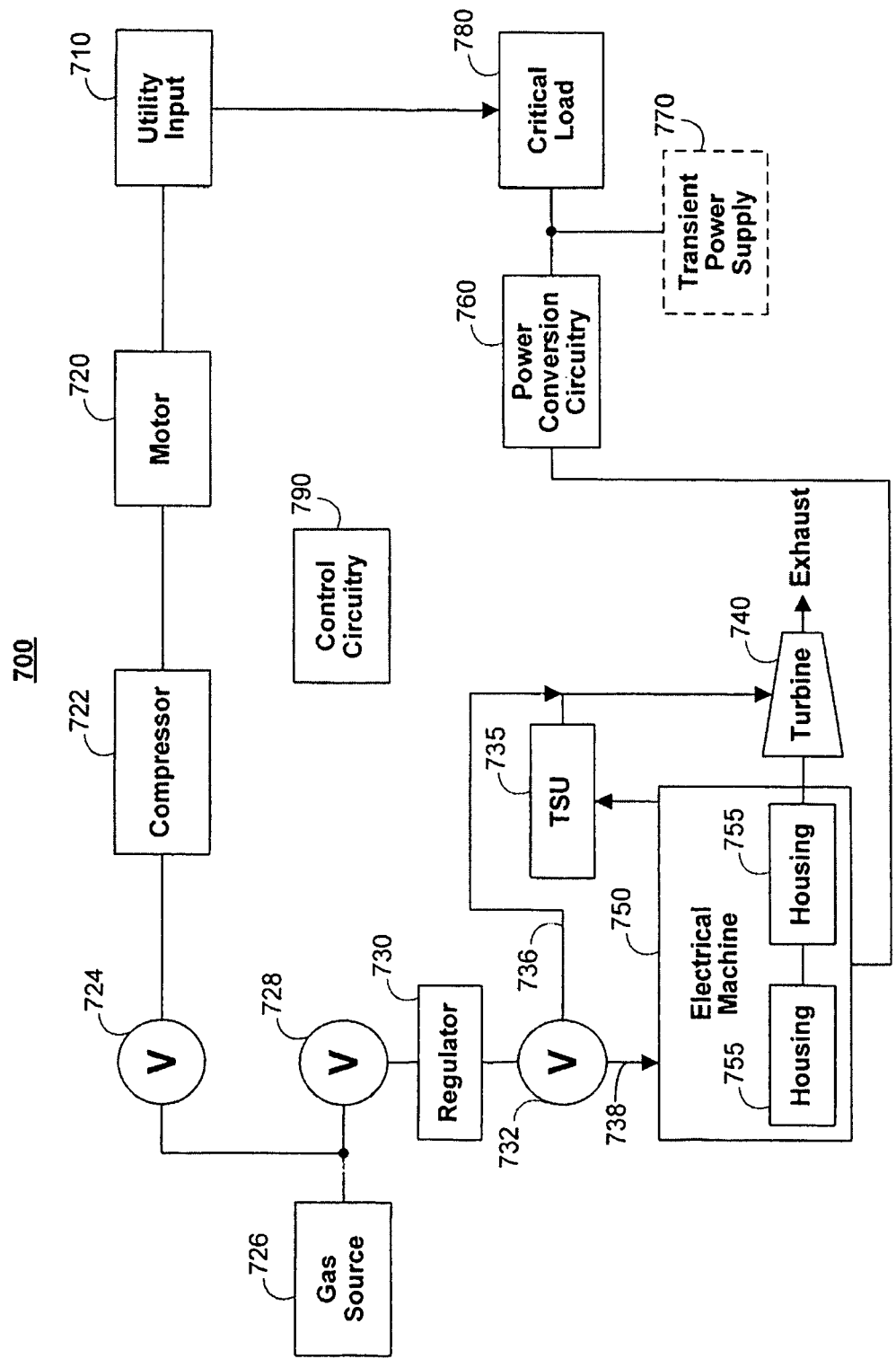
FIG. 7 is a schematic diagram of a thermal and compressed air storage backup energy system using a housing in accordance with the principles of the present invention.

FIG. 7 shows a schematic of a TACAS backup energy system 700 using a housing in accordance with the present invention. Backup energy system 700 may take advantage of a naturally occurring cooling process that occurs during decompression of gas to cool bearings and other parts of the system (e.g., electrical machine, power electronics, etc.). Backup energy system 700 may be connected to utility input 710 which supplies power to a critical load 780 during normal operating conditions. Persons skilled in the art will appreciate that utility input 710 may be any type of primary power source, AC or DC.

Backup energy system 700 may include motor 720, compressor 722, one way valve 724, gas source 726, valve 728, thermal storage unit 735, turbine 740, electrical machine 750, bearing housings 755, power conversion circuitry 760, and control circuitry 790. If desired, optional transient power supply 770 (e.g., flywheel energy storage system, ultracapacitor, batteries, etc.) may also be provided. Electrical machine 750 may be a machine capable of functioning as a motor and a generator. It is understood that turbine 740 and electrical machine 750 may function together as an integrated turbine-generator, but are shown independent of each other to facilitate ease of discussion.

Thermal storage unit 735 may be an exhaustless heater (e.g., a non-polluting heater). Examples of and discussion of the operation of such thermal storage units can be found, for example, in U.S. patent application publication Nos., 2005/0126172 and 2005/0279292, both of which are hereby incorporated by reference herein in their entireties.

During normal operating conditions, utility input 710 supplies power to critical load 780. Utility input 710 may also power motor 720, which drives compressor 722 to charge gas source 726 with compressed gas. The compressed gas may be pushed through one way valve 724 to prevent feedback. Persons skilled in the art will appreciate that gas source 726 can be any suitable gas storage apparatus such as one or more pressure tanks, a cavern, or an underground salt dome.

Although control circuitry 790 is not shown to be connected to any of the components included in backup energy system 700, persons skilled in the art will appreciate that control circuitry 790 can perform control and monitoring functions well known and understood in the art. For example, control circuitry 790 can cause valve 728 to OPEN when utility power is interrupted (e.g., fails).

Regulator 730 regulates the pressure of the gas provided from gas source 726 as the gas is delivered downstream to valve 732. Valve 732 may direct a portion of the regulated gas to path 736 and the balance of the regulated gas to path 738. The gas in path 738 may be routed to electrical machine 750 and then routed to thermal storage unit 735, which heats the gas. The gas in path 736 bypasses thermal storage unit 735, but is recombined with heated gas exiting thermal storage unit 735 before being supplied to turbine 740. This combined gas then drives turbine 740, which in turn drives electrical machine 750 to produce electrical power. The electrical power may be provided to power conversion circuitry 760 which conditions the power before providing it to critical load 780.

The particular valve and gas routing configuration (e.g., paths 736 and 738) shown in FIG. 7 are merely illustrative. If desired, a single gas routing path may be used for routing gas to a turbine, in which case, bypass path 736 may be omitted.

A dual gas path routing system may be preferable to single gas flow path for exercising a greater degree of control over the inlet temperature and pressure of the gas being supplied to turbine 740. Examples of such dual path routing systems are described in more detail in U.S. patent application publication Nos. 2006/0076426 and 2006/0060246, which are hereby incorporated by reference herein in their entireties.

During an emergency mode of operation (e.g., when utility power is interrupted), valve 728 is opened and regulator 730 regulates the expansion of the compressed gas being supplied by gas source 726 to a predetermined pressure. This creates a high-to-low pressure drop, resulting in a Joule-Thompson expansion of gas that results in a substantial drop in the gas temperature.

After the gas expands, the cool gas is routed to electrical machine 750 via path 738. More particularly, the cool gas may be routed to a stator cooling housing (not shown), such as that shown in FIG. 8, to remove heat being produced during the generation of electric power. The stator cooling housing permits cool gas to be directly applied to, or routed proximal to, the stator of electrical machine 750. The gas exits stator cooling housing and is routed to thermal storage unit 735.

In addition, cool gas in path 738 may be routed to housings 755 to provide localized cooling in accordance with the invention. Housing 755 may be similar to the housing discussed above in connection with FIG. 3. In one approach the stator cooling housing may be constructed to route gas to housings 755. In another approach, a separate path may be provided to directly route gas from path 738 to housings 755, omitting any need to route gas from the stator cooling housing. Removing heat from the bearings of electrical machine 750 according to the principles of the invention enables the use of more economical bearing types (e.g., anti-friction grease lubricated bearings). Additionally, by cooling the bearings in housing 755, the bearings may be able to sustain desired operating speeds of electrical machine 750 without overheating, which may cause additional wear or damage to the bearings. During a backup mode of operation, the turbine-generator, which may have a common shaft supported by grease-lubricated anti-friction bearings, may rotate at substantially high speeds (e.g., 50,000 to 70,000 RPMs). Even though at such high speeds, in which high heat loads are generated in the bearings, the bearing housing according to the invention is effective in cooling the bearings to enable the bearings to operate properly throughout the expected operational life of backup energy system 700.

The foregoing discussion of backup energy system 700 is not intended to be a thorough discussion of TACAS systems, but is intended to provide a general framework of a system in which the present invention may be implemented. For a more detailed explanation of TACAS backup power supply systems, as briefly described above, and variations thereof, see U.S. patent application publication No. 2004/0148934, which is hereby incorporated by reference herein in its entirety. The present invention can be incorporated in other emergency backup power delivery systems such as those described in U.S. patent application publication No. 2004/0148922, which is hereby incorporated by reference herein in its entirety.

Figure 8:
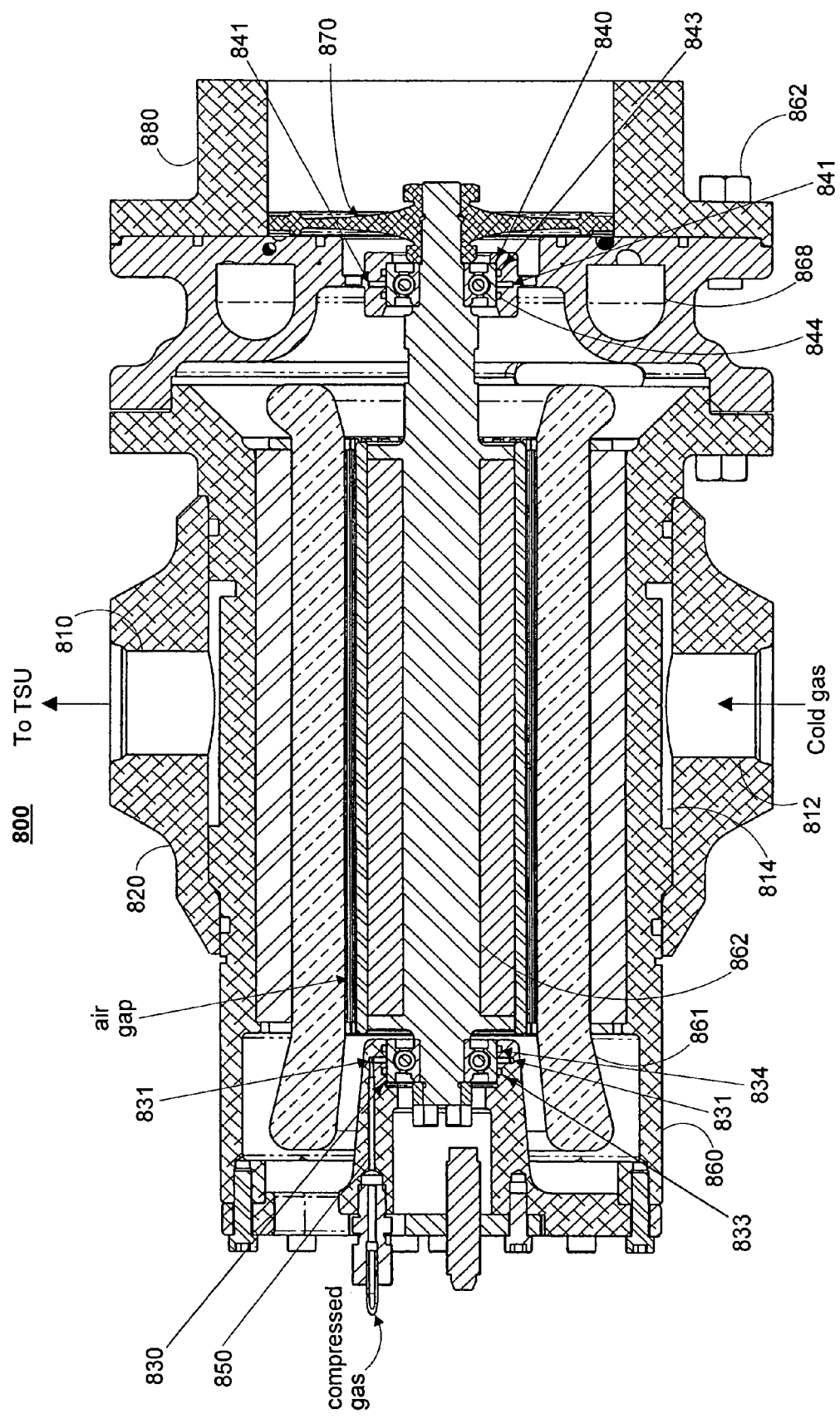
FIG. 8 shows a cross-sectional view of a turbine-generator having a stator cooling housing and housing in accordance with the principles of the present invention.

FIG. 8 shows a cross-sectional view of a turbine-generator assembly 800 having a stator cooling housing 820 enclosing stator 861 and bearing housings 830 and 840 in accordance with the principles of the present invention. Stator 861 may sometimes be referred to herein as a wound stator core, which may include the stator core, stator laminations, and stator windings. As shown, electrical machine 860 may be mounted to turbine 880 via mounting screws 862 (only one is shown). Thrust end bearing housing 840 and non-thrust end bearing housing 830 may support turbine-generator rotor 862. During operation, compressed gas, which may be heated compressed gas, is provided to air plenum 868 to drive turbine fan 870. The spinning of turbine 870 causes rotor 862 to rotate, the rotation of which enables electrical machine 860 to generate power. As electrical machine 860 generates power, heat may be generated. This heat may be removed by cool gas passing through stator cooling housing 820.

Cool gas derived in accordance with the present invention may be supplied to inlet 812, which is connected to an annular channel 814 that permits the cool gas to flow proximal to and around the stator to outlet 810. Annular channel 814 may be a ring of predetermined depth and width that is built into stator housing 820. Further note that gas may split as it enters inlet 812, with a portion of gas passing through a first half of annular channel 814 and the remaining half passing through a second half of annular channel 814. As the cool gas passes through annular channel 814, it may absorb heat from stator 861 and other components associated with electrical machine 860.

Figure 5:
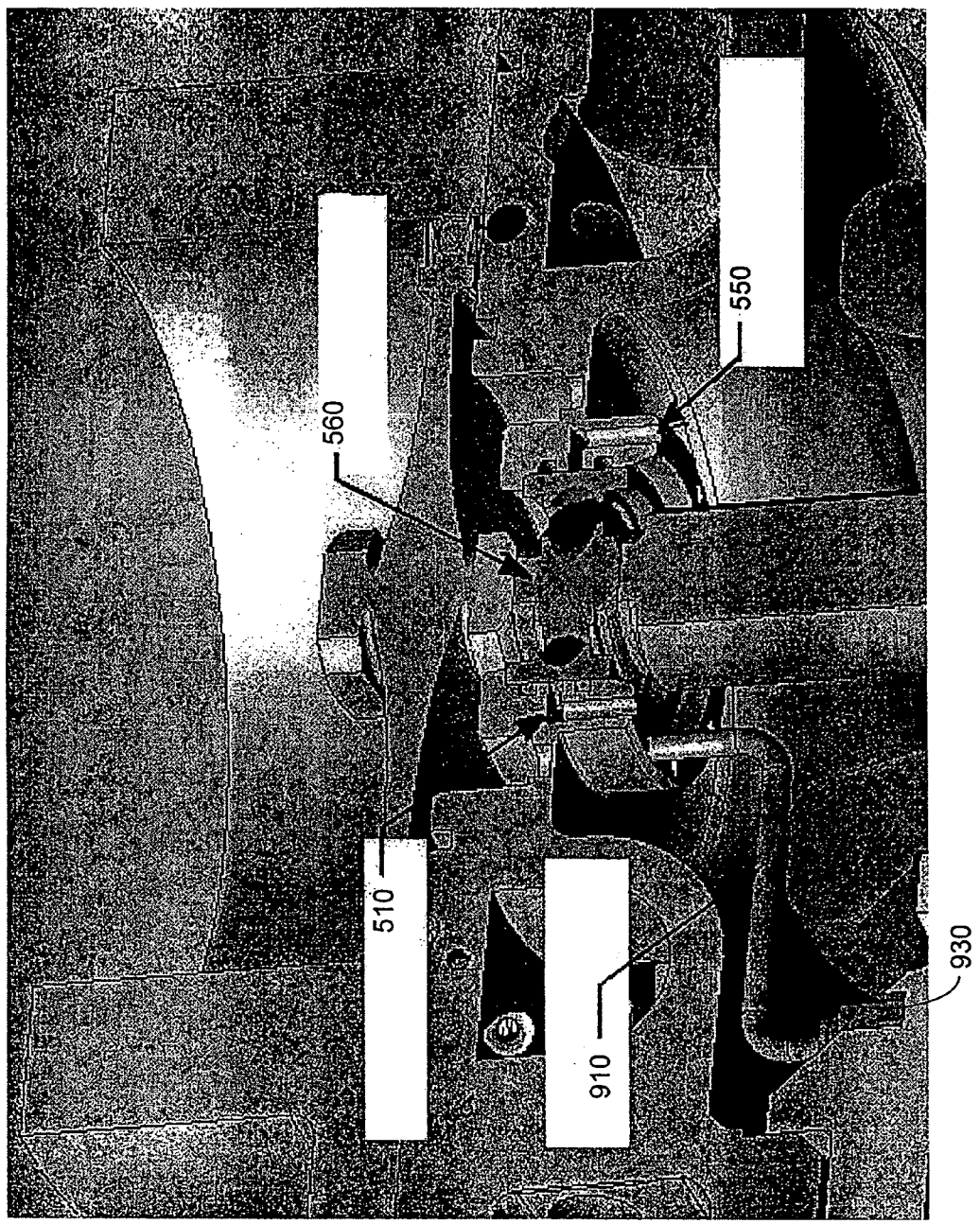
FIG. 5 shows a three-dimensional, partially cutaway, view of a housing in accordance with the principles of the present invention.
Figure 9:
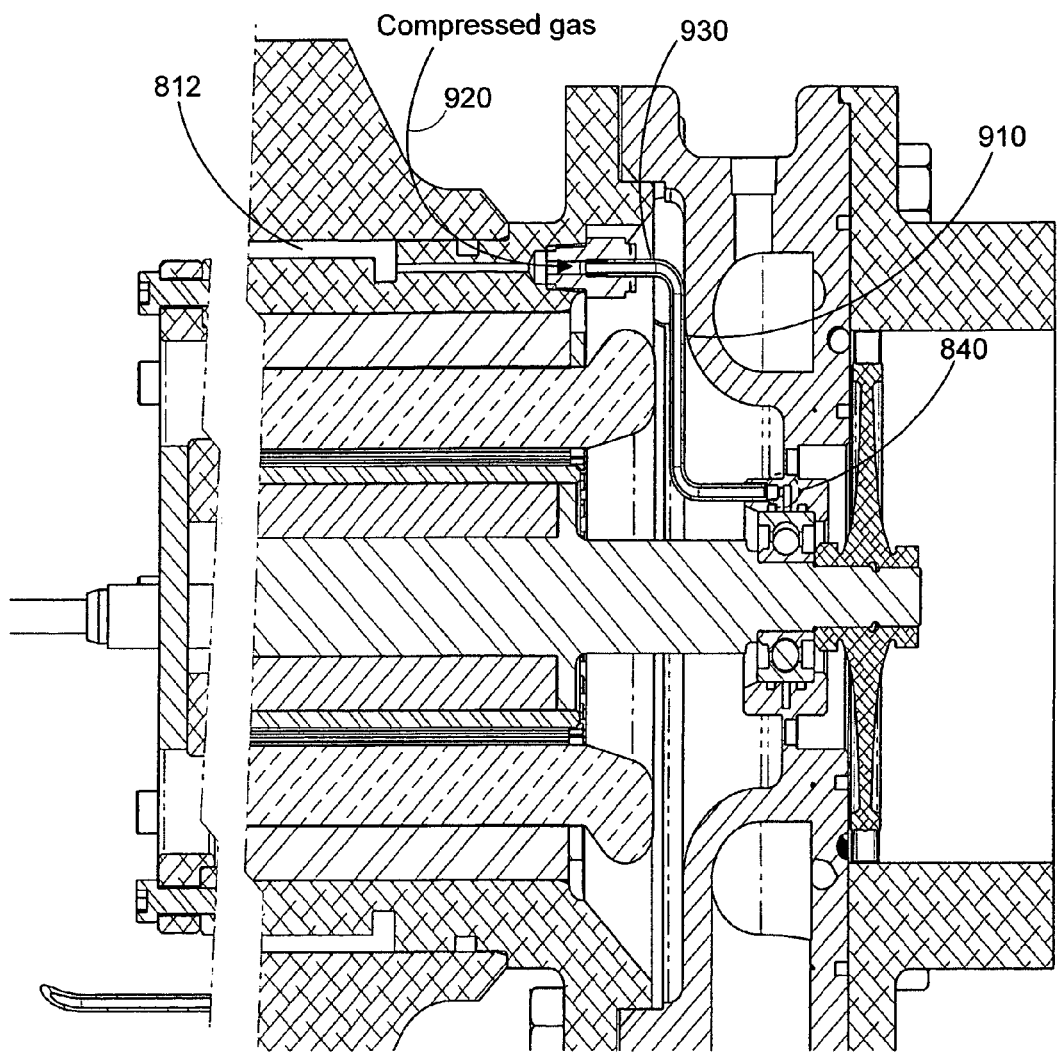
FIG. 9 shows a more detailed cross-sectional view of a portion of the turbine-generator in FIG. 8 in accordance with the principles of the present invention.

Thrust end bearing housing 840 includes an air inlet port (not shown) for receiving a portion of the compressed gas routed to stator cooling housing 820. The received compressed gas is expanded in cooling channel 841 to provide localized cooling of the bearing and exhausted out of exhaust ports (not shown). FIG. 9 shows an enlarged cross-sectional view of a portion of turbine generator 800 of FIG. 8 showing how compressed gas is routed from stator cooling housing 820 to bearing housing 840 in accordance with the principles of the present invention. As shown in FIG. 9, a conduit 920 connects a portion (e.g., inlet 812) of stator cooling housing 820 to conduit coupling 930. Conduit coupling 930 is connected to tubing 910, which routes compressed gas to the inlet port of housing 840. Conduit coupling 930 and tubing 910 are also shown in FIG. 5.

Referring to FIG. 8, non-drive end bearing housing 830 receives compressed gas at an inlet port (not shown) via conduit 850. The received compressed gas is expanded in cooling channel 831 to provide localized cooling of the bearing and exhausted out of exhaust ports (not shown). Conduit 850 may be coupled to receive compressed gas directly from path 738 (of FIG. 7) or from a portion (e.g., inlet 812) of stator cooling housing 820. If gas is received from stator cooling housing 820, an arrangement similar to that discussed in connection with FIG. 9 may be used, except that tubing may be routed externally to electrical machine 860 as opposed to internally within the machine.

Persons skilled in the art will appreciate that any suitable number of different approaches may be practiced for routing compressed air to bearing housings 830 and 840. In addition, persons skilled in the art will appreciate that more than one inlet port may be used to bring compressed gas into the housings.

A secondary cooling benefit is derived from the cooling of bearings in housings 840 and 830. The gas exhausted from housings 840 and 830 may be cool and thus may be routed across structures within electrical machine 860. Therefore, the direction in which the exhaust gas is exhausted may be chosen to maximize the secondary cooling effects. As discussed above in connection with FIG. 3, axially, radially, and obliquely aligned exhaust ports may be used in housings according to the invention.

The direction of exhaust ports of a given housing may be selected based on the location of the housing, desired mass flow characteristics of exhaust gas within electrical machine 860, components within electrical machine 860 that may require cooling, or any other suitable criteria. For example, housing 840 may include axial exhaust ports and housing 830 may include radial exhaust ports. In an alternative arrangement, housings 840 and 830 may include a combination of axial and radial exhaust ports. This alternative arrangement provides dual directionalized flow of exhaust gas that may further enhance the secondary cooling effects. In other arrangements, the exhaust ports may be positioned in oblique directions (e.g., somewhere between the axial and radial positions) relative to the bearing housing. Persons skilled in the art will appreciate that any combination of radial, axial, or oblique exhaust may be provided, as desired.

Referring to both FIGS. 5 and 8, compressed gas may be expanded in expansion channel 510 and exhausted out of exhaust ports 550. Note that for thrust end bearing housing 840, exhaust ports 550 may be positioned in the axial direction with respect to bearing 560. The axial exhaust port arrangement projects the bearing exhaust gas into electrical machine 860 in the direction of non-drive end bearing 830. The bearing exhaust gas may pass through air gaps in electrical machine as it outgases from the machine to the ambient environment, thereby further cooling components (e.g., rotor and stator) within electrical machine 860. For example, the exhaust gas from drive-end bearing housing 840 may travel through air gaps in electrical machine 860 and exit electrical machine 860 through an air outlet port (not shown) near the non-drive-end bearing housing. The exhaust gas exiting housing 840 may combine with the exhaust gas exiting housing 830, which gas may be radially exhausted, prior to exiting electrical machine 860.

The exhaust ports of housings 840 and 830 may be arranged to prevent build up of pressure within electrical machine 860. For example, exhaust ports of housing 840 may be axial, whereas the exhaust ports of housing 830 may radial or axial in the direction pointing away from housing 840. If the pressure in electrical machine 860 surpasses a predetermined amount, the bearing seals may be compromised, allowing gas to push through the internal bearing components, potentially resulting in the expulsion of bearing lubricant. In one embodiment, it may be desirable to keep the pressure within electrical machine 860 below 10 inches water pressure. However, it will be appreciated that different arrangements and different components may be equipped to handle different internal pressures.

Housings 840 and 830 may include grooves 843 and 844, and 833 and 834, respectively, in which membranes may be placed. The membranes may dampen the vibrations of turbine 870, rotor 862, or any other moving part or parts and may reduce noise and wear on system components. By dampening the vibrations, the life of the bearings in bearing housings and other system components may be increased. The membranes may also provide an air tight seal between a portion of the bearing and cooling channels 841 and 831, as explained above in connection with FIG. 3. By maintaining a tight seal between a portion of the outer race of the bearings and the cooling channels, compressed gas may be forced to circulate around the bearings and exit through the exhaust ports. In one embodiment, membranes may be o-rings.

Figure 10:
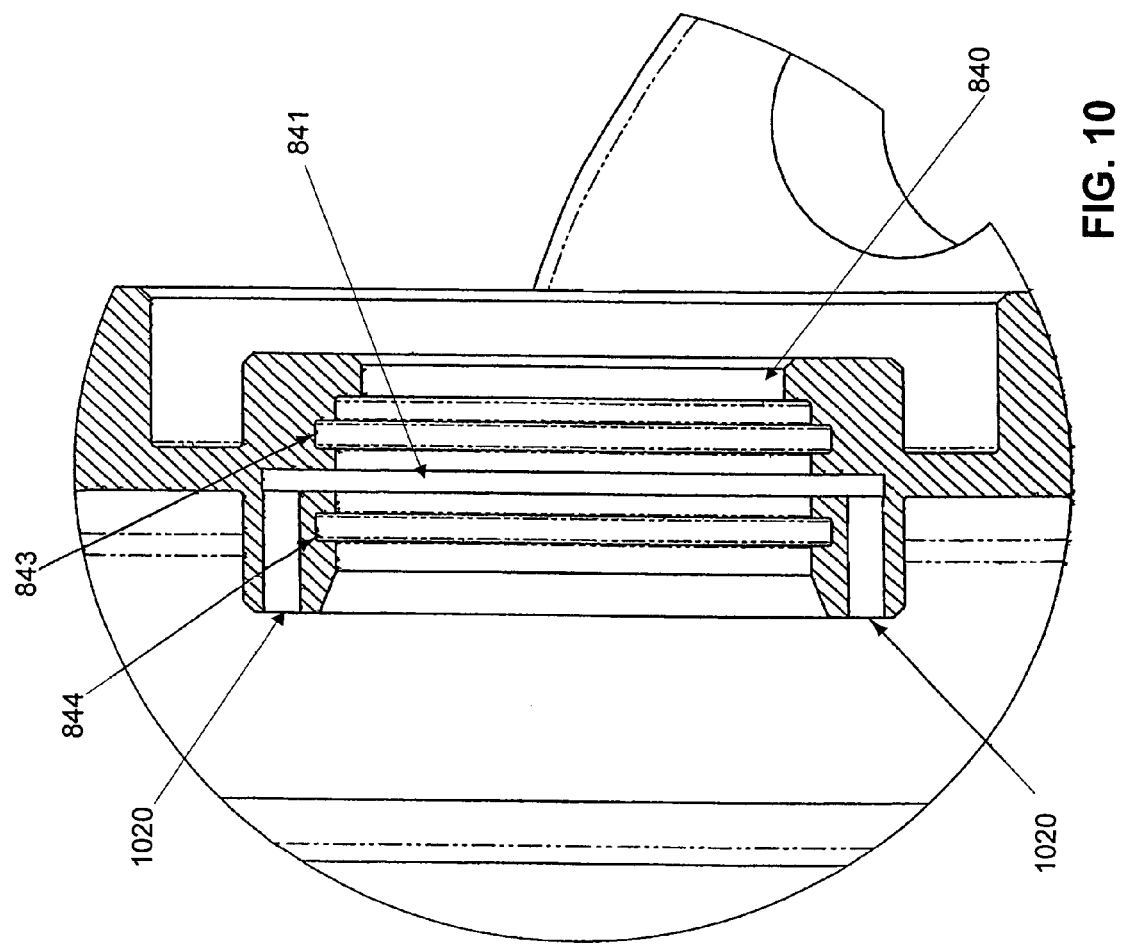
FIG. 10 shows a cross-sectional view of a housing having axially aligned exhaust ports in accordance with the principles of the present invention.

FIG. 10 shows an alternative cross-sectional view of housing 840 (of FIG. 8) showing in more detail the exhaust ports and grooves for containing membranes in accordance with the principles of the present invention. As shown, grooves 843 and 844 are positioned on opposite sides of cooling channel 841. Exhaust ports 1020 are shown to be aligned axially with respect to the center axis of a bearing (not shown).

Figure 11:
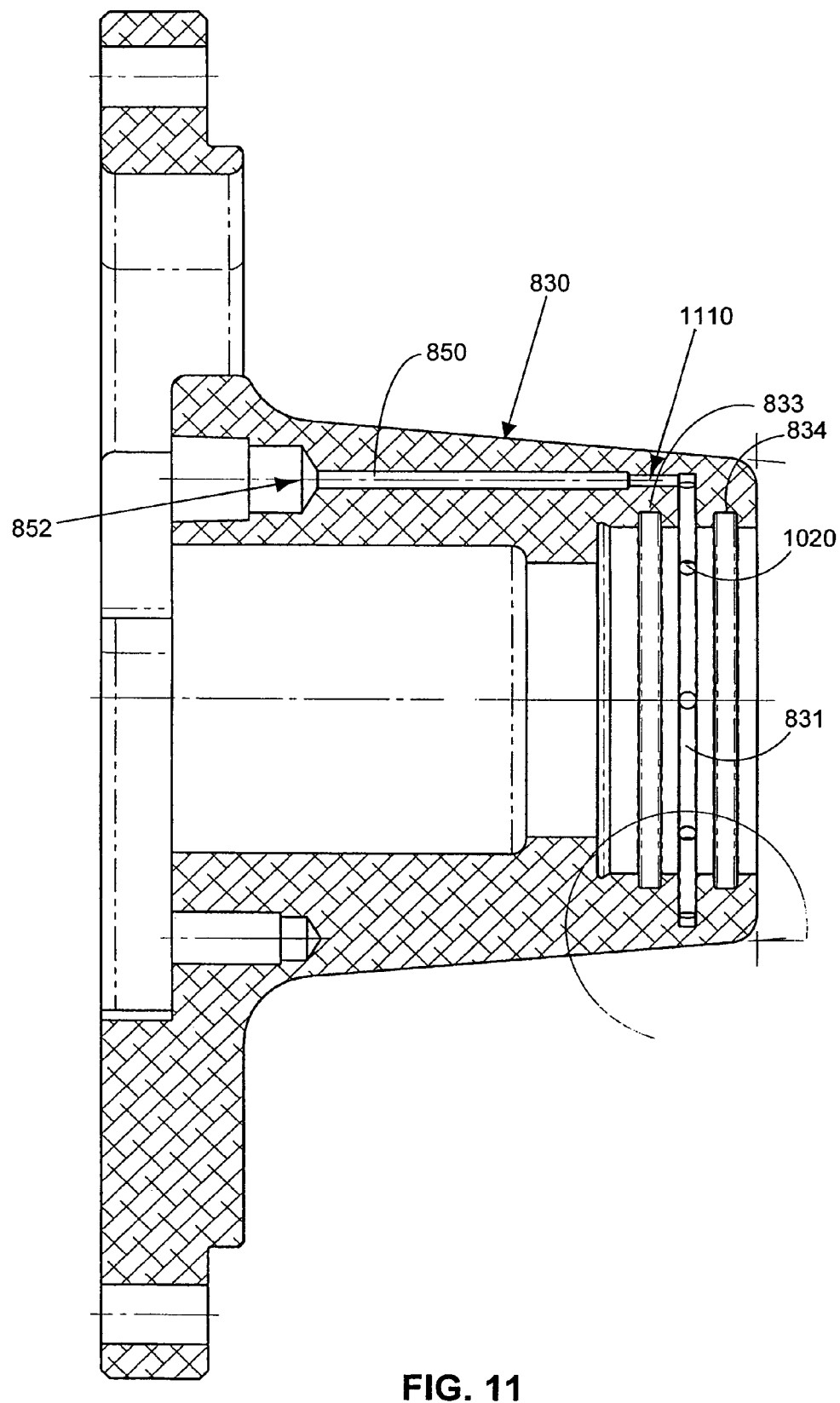
FIG. 11 shows a cross-sectional view of a housing having radially aligned exhaust ports in accordance with the principles of the present invention.

FIG. 11 shows an alternative more detailed cross-sectional view of housing 830 in accordance with the principles of the present invention. As shown, grooves 833 and 834 are positioned on opposite sides of cooling channel 831. Inlet port 852 is coupled to conduit 850, which is coupled to restriction region 1110. Restriction region 1110 connects conduit 850 to cooling channel 831. Exhaust ports 1020 are shown to be radially oriented exhaust ports.

Figure 12:
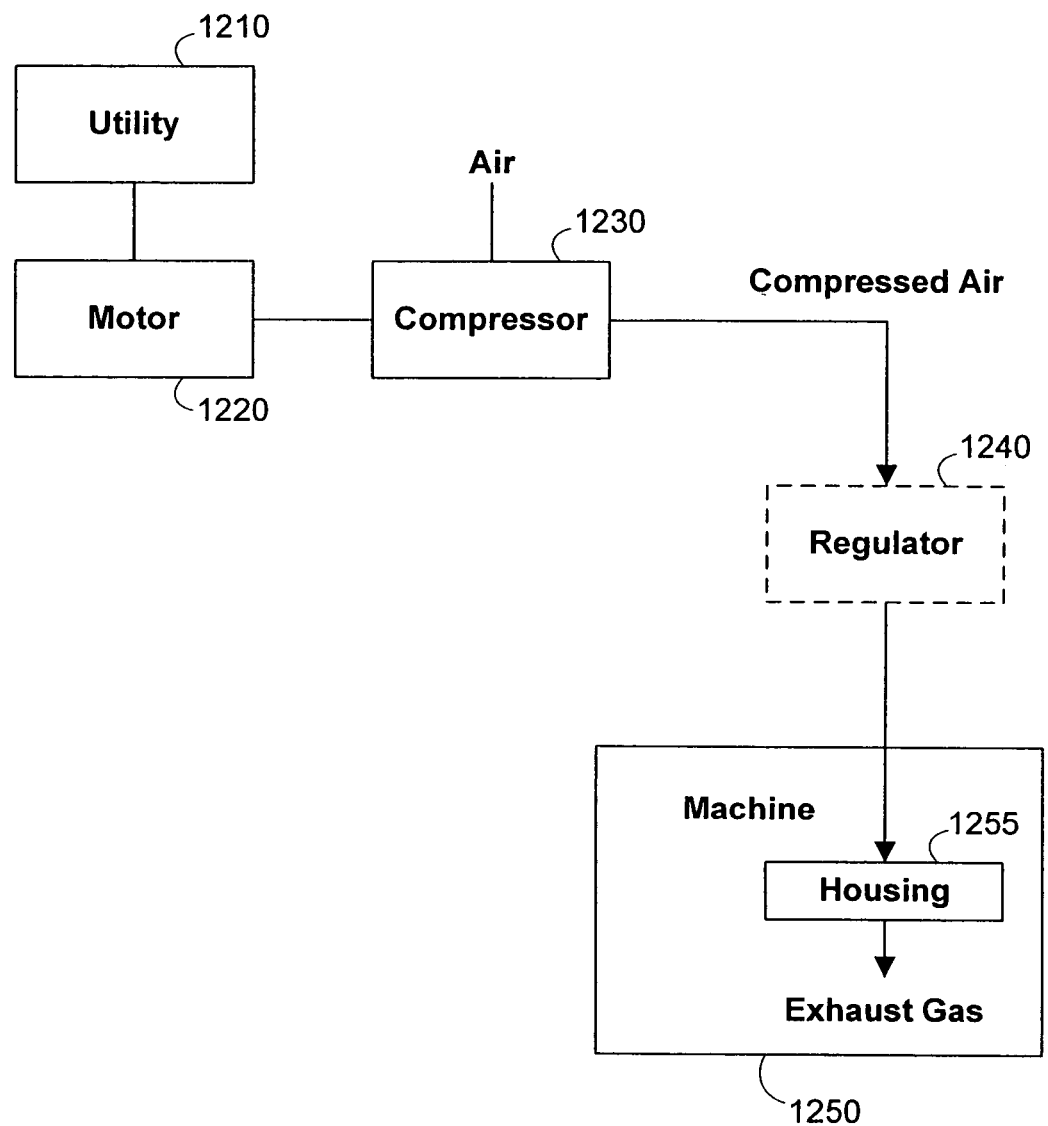
FIG. 12 is an illustrative schematic diagram of a system using a housing in accordance with the principles of the present invention.

FIG. 12 shows an illustrative schematic diagram of a system using a housing in accordance with the principles of the present invention. System 1200 may include a utility power source 1210, a motor 1220, a compressor 1230, and a machine 1250 having at least one housing 1255. Machine 1250 is a black box abstraction representative of a device or machine having a moving part or parts that require cooling. Housing 1255 provides cooling of that part or parts in accordance with the invention. For example, housing 1255 may be a housing such as housing 830 of FIG. 8.

When machine 1250 is operating, utility power 1210 may supply power to motor 1220 which drives compressor 1230 to produce compressed air. Although not shown, system 1200 may include relief valves to protect against over pressurization in the lines containing the compressed air. The pressure of the compressed air may be regulated by optional regulator 1240. The compressed air is routed to housing 1255 where it expands and directly contacts the moving part or parts of machine 1250.

If desired, compressor 1230 may be driven by a different prime mover other than motor 1220. For example, a fuel powered machine (e.g., diesel engine) may drive compressor 1230. In another approach, a pressure vessel (e.g., pressurized tank) may be substituted in place of utility 1210, motor 1220, and compressor 1230.

Figure 13:
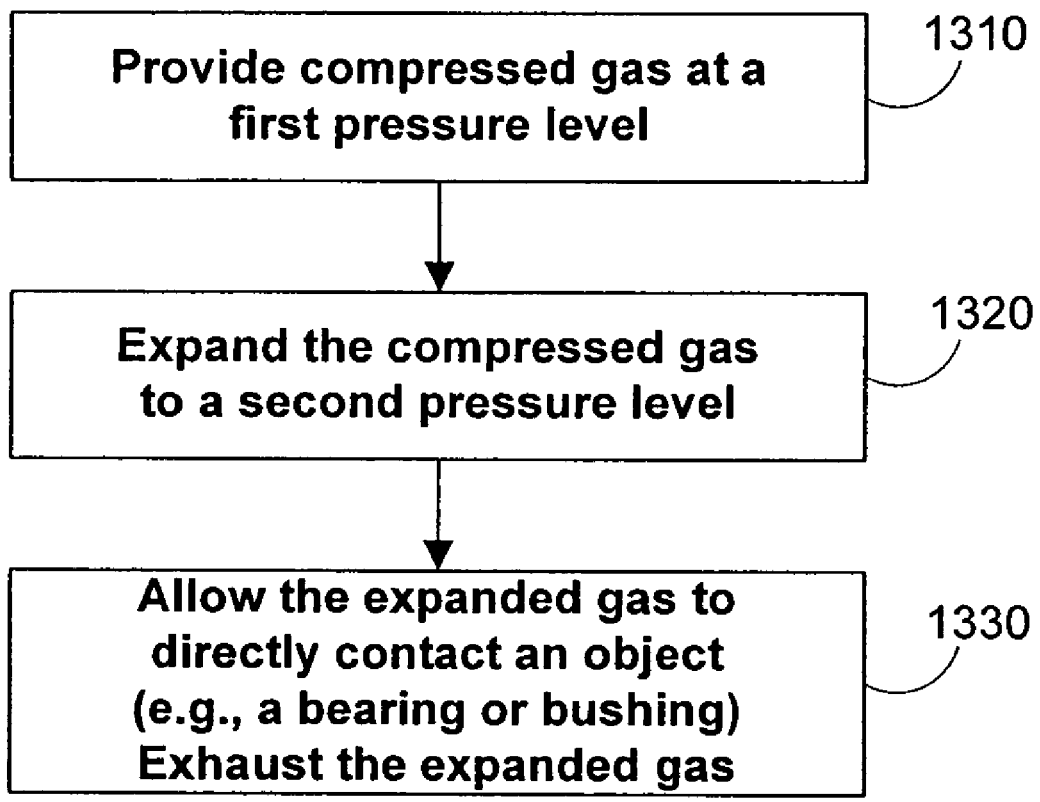
FIG. 13 is a flowchart showing steps for cooling an object in accordance with the principles of the present invention.

FIG. 13 is a flowchart showing steps for cooling an object (e.g., bearing or bushing) in accordance with the principles of the present invention. At step 1310, a compressed gas having a first pressure level is provided. For example, the compressed gas at the first pressure level may be the compressed gas supplied to an inlet port of a housing. The compressed gas may be compressed air, a compressed noble gas, or other known gas or combination of gases.

At step 1320, the compressed gas is expanded (or decompressed) to a second pressure level. The expansion may cause the temperature of the gas to drop to a lower temperature than the temperature of the gas existing at the first pressure level. The compressed gas may expand, for example, in a cooling channel of the housing such as bearing housing 840 of FIG. 8. At step 1330, the expanded gas is allowed to directly contact the object. For example, the cooling channel may permit the expanded gas to directly contact the object. Permitting the gas to directly contact the object may further increase the cooling effectiveness of the expanded gas.

The expanded gas may pick up additional heat from the object as it is exhausted away. The exhausted gas may be exhausted to a region having a third pressure level, which may be ambient or atmospheric pressure. The third pressure level may be at a pressure level lower than the second pressure level to provide, for example, sufficient outgoing velocity of the exhausted gas or further cooling of the gas as it decompresses from the second pressure level to the third pressure level. If desired, the third pressure level may be substantially the same as the second pressure level in which case the cooling housing is constructed to permit the gas in the expansion channel to expand to an ambient pressure or atmospheric pressure.

Figure 14:
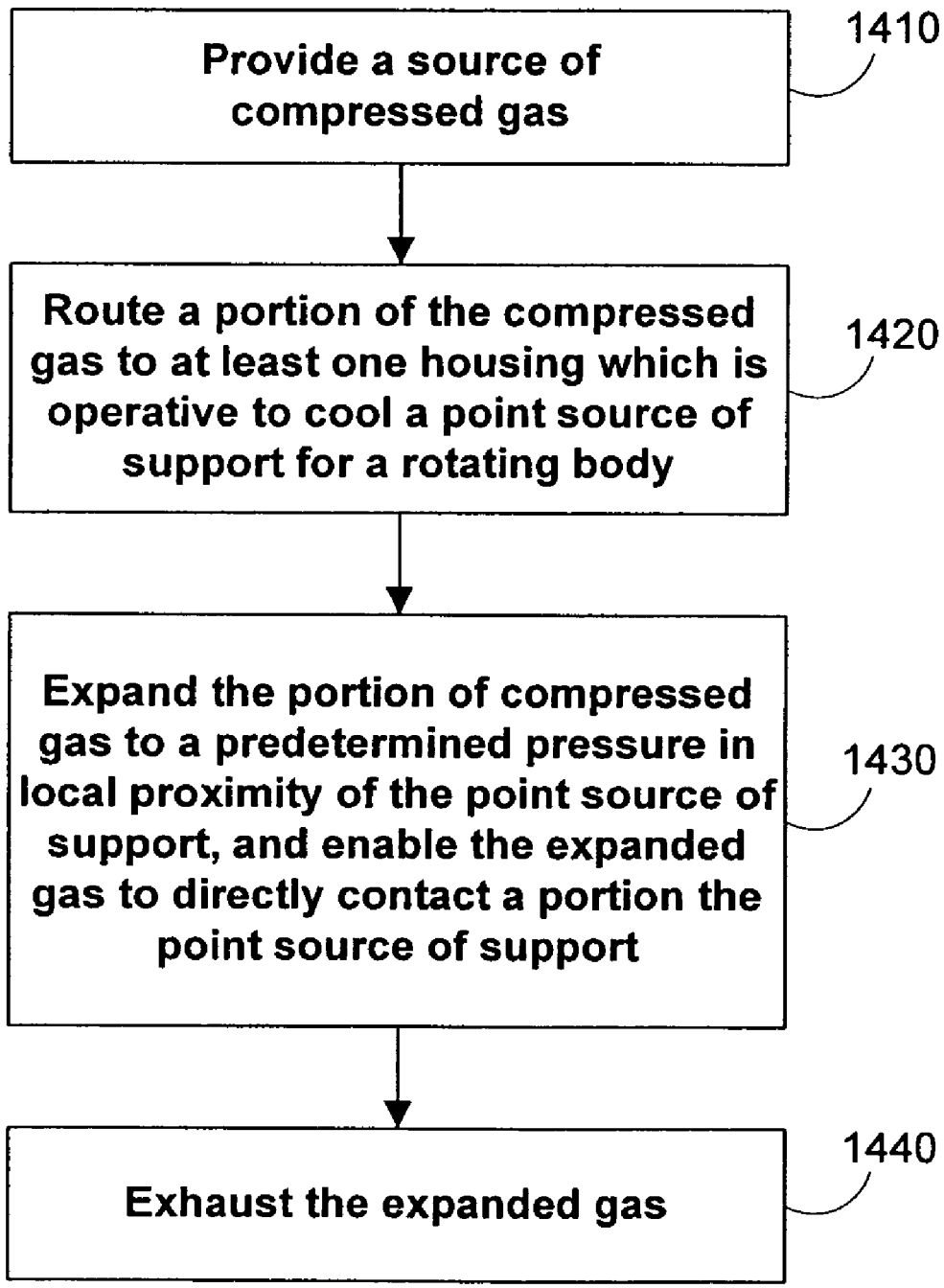
FIG. 14 is a flowchart showing steps for cooling a point source of support for a rotating body that is in accordance with the principles of the present invention.

FIG. 14 shows a flowchart for cooling a point source of support for a rotating body that is in accordance with the principles of the present invention. At step 1410, a source of compressed gas is provided. For example, the source of compressed gas may be a pressure tank or other device capable of storing a gas. In another example, the source of compressed gas may be a compressor such as that shown in FIG. 1.

At step 1420, at least a portion of the compressed gas is routed to at least one housing which is operative to cool a point source of support for a rotating body. For example, FIG. 9 shows an example of routing a portion of the compressed gas to a housing. FIG. 11 shows another example in which compressed gas is routed to a housing.

At step 1430, the portion of compressed gas is expanded to a predetermined pressure in local proximity of the point source of support and is allowed to directly contact a portion of the point source of support. At step 1440, the expanded gas is exhausted. The expanded gas may be exhausted, for example, to an ambient environment.

Thus it is seen that systems and methods for providing localized cooling of bearings or other objects are provided. A person skilled in the art will appreciate that the present invention can be practiced by other than the described embodiments, which are presented for purposes of illustration rather than of limitation, and the present invention is limited only by the claims which follow.

What is claimed is:

1. A housing for containing a compressed gas and a bearing having an outer race and an inner race, wherein the inner race is movable with respect to the outer race, and for expanding the compressed gas to a predetermined pressure and allowing the gas to directly contact the outer race of the bearing as it expands, comprising:
   a restriction region having a cross-sectional area;
   a channel fluidicly coupled to the restriction region, the channel extending around the outer race and constructed to allow the expanding gas to directly contact the outer race; and
   at least one exhaust port fluidicly coupled to the channel, each exhaust port having a predetermined cross-sectional area, wherein a sum total of the cross-sectional area of the at least one exhaust port is sized with respect to the cross-sectional area of the restriction region to expand the compressed gas to the predetermined pressure within the channel.

2. The housing of claim 1, further comprising an inlet port fluidicly coupled to the restriction region.

3. The housing of claim 1, wherein the outer race has a top portion and a bottom portion, the housing further comprising:
   a first membrane support channel aligned with and extending around the top portion of the outer race; and
   a second membrane support channel aligned with and extending around the bottom portion of the outer race.

4. The housing of claim 3, further comprising:
   a first membrane coupled between the top portion and the first membrane support channel; and
   a second membrane coupled between the bottom portion and the second membrane support channel,
   the first and second membranes providing a seal which causes the expanded gas to flow around the outer race of the bearing.

5. The housing of claim 4, wherein the first and second membranes are o-rings.

6. The housing of claim 1, the bearing having a central axis, wherein the at least one exhaust port is aligned in a predetermined position with respect to the central axis.

7. The housing of claim 6, wherein the predetermined position is an axial position, a radial position, or an oblique position with respect to the central axis.

8. A machine comprising a rotating body supported by the bearing of claim 1, the machine further comprising the housing of claim 1.

* * * * *